United States Patent [19]

Janson

[11] Patent Number: 4,775,813
[45] Date of Patent: Oct. 4, 1988

[54] ELECTRIC MOTOR HAVING FORMED STATOR SECTIONS WITH COPLANAR TEETH

[75] Inventor: Jan Janson, Eindhoven, Netherlands

[73] Assignee: U.S. Philips Corporation, New York, N.Y.

[21] Appl. No.: 27,780

[22] Filed: Mar. 19, 1987

[30] Foreign Application Priority Data

Mar. 21, 1986 [NL] Netherlands ........................ 8600727

[51] Int. Cl.⁴ ............................................. H02K 1/12
[52] U.S. Cl. .................................... 310/257; 310/42; 310/156; 310/185
[58] Field of Search ................ 310/42, 254, 162, 258, 310/163, 156, 164, 257, 268, 180, 184, 208, 218, 177, 158, 159, 185

[56] References Cited

U.S. PATENT DOCUMENTS

| | | | |
|---|---|---|---|
| 2,897,387 | 7/1959 | Welter | 310/268 |
| 3,310,696 | 3/1967 | Jullien-David | 310/164 |
| 3,459,982 | 8/1969 | Cartier | 310/257 X |
| 3,845,335 | 10/1974 | Oguey | 310/257 X |
| 4,361,776 | 11/1982 | Hayashi | 310/268 |
| 4,459,501 | 7/1984 | Fawzy | 310/156 |
| 4,565,938 | 1/1986 | Fawzy | 310/156 |
| 4,626,727 | 12/1986 | Janson | 310/268 |
| 4,701,656 | 10/1987 | Fawzy | 310/156 |

FOREIGN PATENT DOCUMENTS 8401519 12/1985 Netherlands ................ 310/268 UX Primary Examiner—R. Skudy
Attorney, Agent, or Firm—F. Brice Faller

[57] ABSTRACT

An electric motor comprises a rotor (20), an annular stator coils (44A, 44B), and a stator body having a central stator portion (24A, 24B) which is disposed coaxially around the rotor shaft (18) and a number of stator teeth. The stator teeth each have a proximal portion (28) secured to the central stator portion and a distal portion (30) having an axial pole face (30A) adapted to cooperate with an axially magnetized ring (20A) of the rotor. Half of the stator teeth also comprise an axial tooth portion (42) which extends between the proximal portion and the distal portion of the relevant stator tooth, because the proximal portions and the distal portions of these teeth are disposed in different axially spaced radial planes. The stator coils are disposed in the space between the central stator portion and all the axial tooth portions.

5 Claims, 2 Drawing Sheets

ELECTRIC MOTOR HAVING FORMED STATOR SECTIONS WITH COPLANAR TEETH

BACKGROUND OF THE INVENTION

This invention relates to an electric motor comprising a rotor rotatable about a rotor shaft and having an axially magnetized permanent-magnetic ring. A stator has a stator body comprising a central stator portion disposed coaxially around the rotor shaft and stator teeth each having a proximal portion, secured to the central stator portion and which extends in an at least substantially radial direction, and a distal portion, connected to said proximal portion and having a pole face. All the pole faces are disposed in one place transverse to the rotor shaft and cooperating with the rotor via an air gap.

Such a motor is disclosed in Netherlands Patent Application No. 8401519, to which U.S. Pat. No. 4,626,727 corresponds, herein incorporated by reference. The known motor has a star-shaped flat laminated stator core with radially extending stator teeth each comprising a proximal portion around which a stator coil is arranged and a distal portion comprising an axial pole face. Thus, each stator tooth in the known motor carries a winding. This need not be a problem in the case of a stator comprising only a small number of stator teeth, but when many stator teeth are required in the electric motor the provision of windings on the individual stator teeth leads to an intricate stator construction, requiring a cumbersome, hence costly production method.

SUMMARY OF THE INVENTION

It is the object of the invention to provide a motor in which the stator is constructed in such a way that in principle any desired number of stator teeth is possible without giving rise to any significant problems in the manufacture in the stator.

To this end at least some of the stator teeth each have an axial tooth portion which extends between the proximal portion and the distal portion of the relevant stator tooth. The proximal portions and the distal portions, of those teeth are disposed in different axially spaced radial planes, the stator coil being arranged coaxially around the rotor shaft in the space between the central stator portion of all the axial tooth portions.

The stator teeth themselves carry no windings, which provides a greater freedom with respect to the choice of the number of the stator teeth.

In an embodiment in which the motor comprises an even number of stator teeth, half the number of stator teeth have axial tooth portions, the relevant stator teeth being regularly interposed between the other stator teeth.

This embodiment may be constructed as a single-phase AC or DC motor, whose stator body can be of very simple construction.

A preferred embodiment is characterized in that of the stator teeth comprising axial tooth portions, some of the proximal portions are disposed in a first radial plane which is shifted in a first axial direction relative to the radial plane in which all the distal portions are disposed. The other proximal portions of the relevant stator teeth are disposed in a second radial plane which is shifted in a second axial direction relative to the radial plane in which all the distal portions are disposed. At least one further stator coil is arranged coaxially around the rotor shaft in the space between the central stator portion and all the axial portions to enable the motor to be constructed as a multi-phase motor.

This embodiment is very suitable to be constructed as a two-phase DC motor. Preferably, the stator body then comprises two parts constituted by two axially superposed stator-body parts, each of the parts comprising a ferromagnetic sheet which is given the desired shape by mechanical operations such as cutting and punching. Preferably, said parts each comprise half the total number of stator teeth, the stator teeth of one part being interposed between the stator teeth of the other part when the parts are assembled to form the stator body. In this respect it is favourable to mount the stator coils before the parts are assembled.

In order to reduce possible eddy-current losses a further embodiment is characterized in that said sheet is laminated.

DETAILED DESCRIPTION OF THE PREFERRED EMBODIMENT

Figure 1:
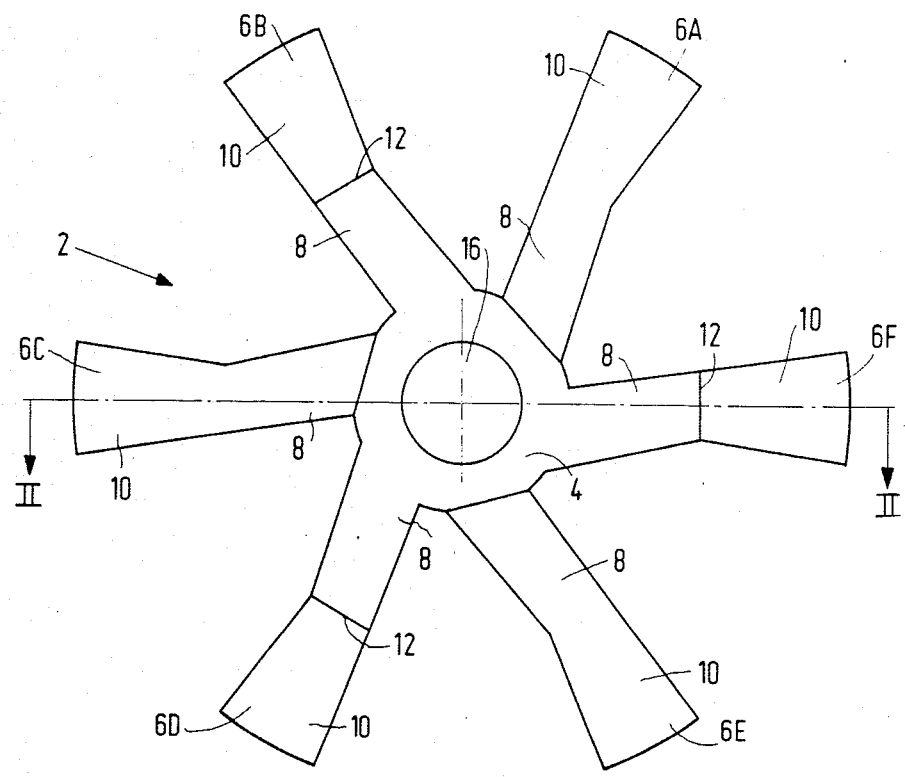
FIG. 1 is a plan view of a stator body.
Figure 2:
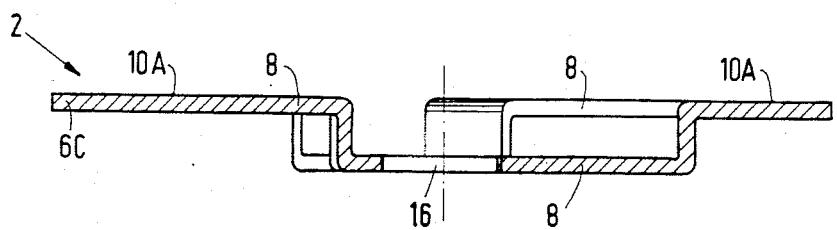
FIG. 2 is a sectional view taken on the line II—II in FIG. 1.
Figure 3:
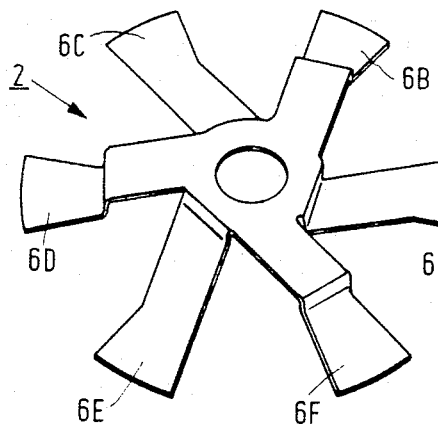
FIG. 3 is a perspective view of the stator body of FIG. 1.
Figure 4:
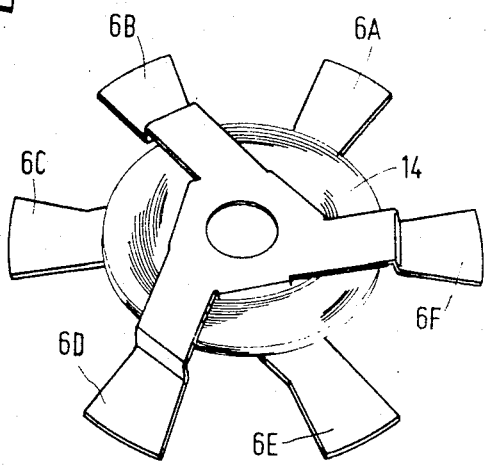
FIG. 4 is a perspective view of the stator body of FIG. 1, provided with a stator coil.

The stator body 2 shown in FIGS. 1 to 4 comprises a central stator portion 4 and six stator teeth 6A, 6B, 6C, 6D, 6E and 6F connected to the stator portion 4. The stator portion 4 and the stator teeth 6A–6F are manufactured in one piece by shearing and forming a ferromagnetic plate. The stator teeth 6A–6F each comprise a proximal portion 8, which adjoins a radial or axial part of the central stator portion 4, and a distal portion 10, which terminates in the free end of a stator tooth. The distal portions 10, which comprise axial pole faces 10A, are all situated in the same radial plane, whilst the proximal portions 8 are alternately situated in two axially spaced planes, the proximal portions of the stator teeth 6A, 6C and 6E being disposed in the same plane as the distal portions 10. The other stator teeth, namely 6B, 6D and 6F each comprise an axial tooth portion 12 which is disposed between the proximal portion 8 and the distal portion 10 and which bridges the axial distance between the proximal portion and the distal portion, all the tooth portions 12 being disposed on an imaginary cylindrical surface. A stator coil 14 (see FIG. 4) is wound around the central stator portion 4 and fills the space between the central stator portion and all the axial tooth portions 12. The stator portion 4 is formed with a central opening 16 for mounting rotor bearing means, not shown. The stator body with stator coil described above is suitable for use in, for example, a single-phase AC motor.

Figure 5:
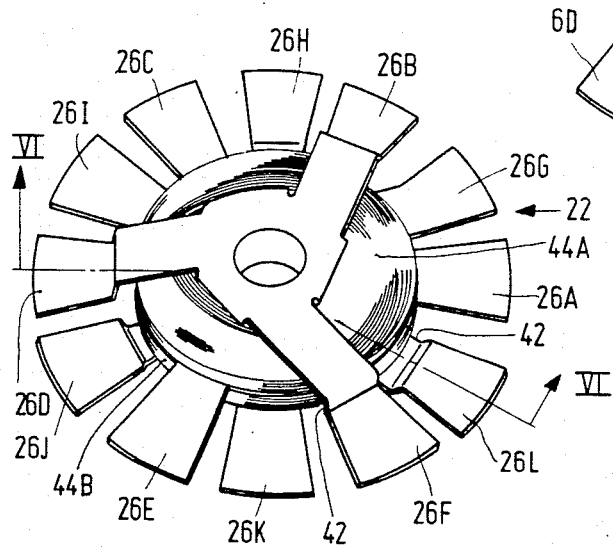
FIG. 5 is a perspective view of a stator body for a second embodiment.
Figure 6:
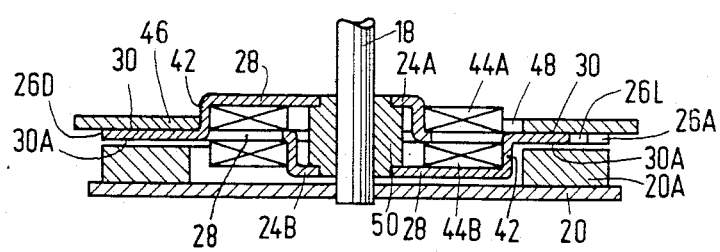
FIG. 6 is a sectional view taken on the line VI—VI in FIG. 5.

The electric motor shown in FIG. 6, whose stator body and stator coils are shown separately in FIG. 5, is a brushless two-phase DC motor. The motor comprises a rotor 20 which is rotatable about a rotor shaft 18 and which comprises a ferromagnetic disk and an axially magnetized permanent-magnet ring 20A comprising 18 rotor poles. Further, the motor comprises a two-part stator body 22 comprising two central stator portions 24A, 24B and twelve stator teeth 26A-26L. One of the central stator portions 24A carries six stator teeth 26A-26F and the other portion 24B carries the other stator teeth 26G-26L.

All the stator teeth 26A-26L comprise a proximal portion 28 and a distal portion 30, the proximal portion being connected to the central stator portion 24A, 24B and the distal portion being constituted by the free end portion of each stator tooth and comprising a pole face 30A for cooperation with the rotor 20. The two central stator portions 24A and 24B are axially superimposed and are rotated relative to each other so that the distal portions 30 of the stator teeth 26A-26F are disposed between the distal portions 30 of the teeth 26G-26L. Moreover, the axial dimension of the central basic portion is such that all the distal portions 30 are disposed in the same radial plane perpendicular to the rotor shaft 18, so that all the pole faces 30A are also disposed in one radial plane. The proximal portions 28 are situated in three different axially spaced radial planes. The proximal portions 28 of the stator teeth 26A, 26C, 26E, 26G, 26I, and 26K are disposed in the same radial plane in which the distal portions 30 are situated. The proximal portions 28 of the other stator teeth, namely 26B, 26D, 26F and 26H, 26J, 26L are disposed in radial planes which are shifted relative to the plane in which the distal portions 30 are disposed in a first and a second axial direction respectively. For this purpose the stator teeth 26B, 26D, 26F, 26H, 26J and 26L each comprise an axial tooth portion 42 which bridges the axial distance between the proximal portion 28 and the distal portion 30. The axial tooth portions 42 are all disposed on an imaginary cylindrical surface.

In the space between the central stator portions 24A and all the axial stator portions 42 of the stator teeth 26B, 26D and 26F a first annular stator coil 44A is arranged and in the corresponding space between the portion 24B and the axial stator portions 42 of the stator teeth 26H, 26J and 26L a second annular stator coil 44B is arranged.

In this embodiment the stator teeth 26A-26L do not extend in perfectly radial directions but, viewed from the rotor shaft 18, they are shifted through a small angle relative to the radial direction. This enables the differently constructed stator teeth to be interposed most effectively, so that a central stator portion of small diameter can be obtained. In order to minimize eddy-current losses it may be favourable to laminate the stator body 22.

By means of connections, not shown, for example metal or plastics pins, the stator body 22 is secured to a support 46, which may be constructed as a printed circuit board. The support 46 is formed with a recess 48 to receive a part of the stator body 22 and the coil 44A. A bearing bush 50 for the rotor shaft 18, which bush also serves as a spacer, is provided between the central stator portions 24A and 24B.

The flat motor shown in FIG. 6, which may be used in, for example, audio equipment such as compact-disc players and in data-storage equipment, such as floppydisc drives, can be constructed and manufactured very simply. The two halves of the stator body may be stamped from a ferromagnetic sheet material, for example laminated sheet iron, after which each half is provided with a winding and subsequently the halves are assembled and secured to the support which has been previously provided with the required electronic devices. After this the rotor may be added. Although the two-phase version shown has 12 stator teeth and 18 magnet poles (not shown) the scope of the invention is not limited to these numbers.

What is claimed is:

1. Electric motor comprising:
   a motor which is rotatable about a rotor shaft and which comprises an axially magnetized permanent-magnetic ring,
   a stator having a first stator body part comprising a central stator portion disposed coaxially around the rotor shaft, and stator teeth, which stator teeth each comprise a proximal portion, which is coplanar with the central stator portion and which extends outward in an at least substantially radial direction therefrom, and a distal portion, which is connected to said proximal portion and which portion comprises a pole face, all the distal portions being disposed in one plane transverse to the rotor shaft and cooperating with the rotor via an air gap, and
   a first stator coil, characterized in that
   at least some of the stator teeth each comprise an axial tooth portion which extends between the proximal portion and the distal portion thereof of which stator teeth the proximal portions and the distal portions are disposed in axially spaced respective first and second radial planes, the stator coil being arranged coaxially around the rotor shaft in the space between the central stator portion and all the axial tooth portions.

2. An electric motor as claimed in claim 1, in which the first stator body part comprises an even number of stator teeth, characterized in that half the number of stator teeth comprise said axial tooth portions, the other half of the stator teeth being regularly interposed therebetween and having proximal portions in the second radial plane, said coil lying between said first and second radial planes.

3. An electric motor as claimed in claim 1, characterized in that at least some of the stator teeth and at least a part of the central stator portion are formed in one piece from a sheet of a ferromagnetic material.

4. An electric motor as claimed in claim 3, characterized in that said sheet is laminated.

5. An electric motor as in claim 1 further comprising
   a second stator body part like said first stator body part and likewise disposed coaxially about said rotor shaft, the central stator portion of said second stator body part being axially spaced from the central stator portion of said first stator body part, the distal portions of the stator teeth of the second stator body part being coplanar with and regularly interposed between the distal portions of the stator teeth of the first stator body part,
   a second stator coil arranged coaxially around the rotor shaft in between the central stator portion of the second stator body part and all the axial tooth portions thereof.

* * * * *